United States Patent

[11] 3,580,116

[72] Inventor Janis Tenisons
 Edwardsburg, Mich.
[21] Appl. No. 736,717
[22] Filed June 13, 1968
[45] Patented May 25, 1971
[73] Assignee Tecumseh Products Company
 Tecumseh, Mich.

[54] CLUTCH ADJUSTMENT TOOL
 5 Claims, 6 Drawing Figs.
[52] U.S. Cl. ................................................. 81/302,
 81/5.1, 81/419
[51] Int. Cl. ..................................................... B25b 7/00
[50] Field of Search ........................................... 81/5.1, 3, 1,
 419, 418, 426, 415, 302

[56] References Cited
UNITED STATES PATENTS
2,897,701  8/1959  Strnisha ........................ 81/5.1

*Primary Examiner*—Lester M. Swingle
*Assistant Examiner*—Roscoe V. Parker
*Attorney*—Barnes, Kisselle, Raisch & Choate ABSTRACT: A plierslike device with a pair of arms interconnected for movement relative to one another for manipulating a wear takeup nut and an associated spring detent in a friction clutch so that the detent may be readily released and the nut readily adjusted manually at a mechanical advantage provided by the tool and from outside the clutch housing. The working end of one arm of the tool has a slot between chisel point faces to pry out and hold the detent, and the working end of the other arm has a narrow projection or tongue to engage the notched periphery of the nut. Both ends of the tongue arm are offset with respect to the chisel point arm so that the arms do not interfere when they are pivoted past each other.

INVENTOR.
JANIS TENISONS

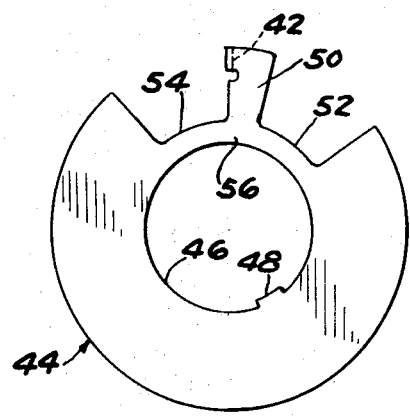
FIG. 3
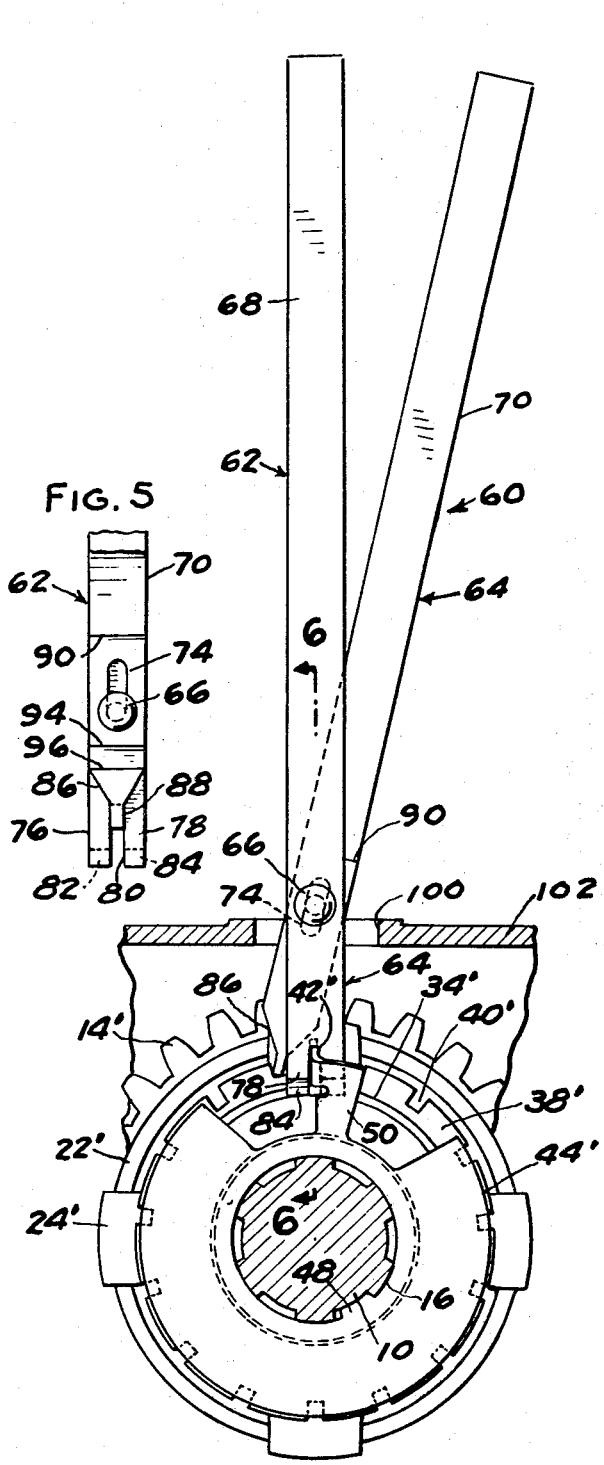
FIG. 5
FIG. 4
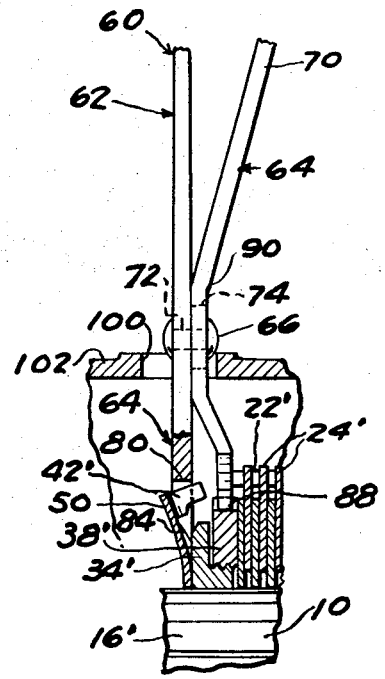
FIG. 6
INVENTOR.
JANIS TENISONS
BY
Barnes, Kisselle, Raisch & Choate
ATTORNEYS

CLUTCH ADJUSTMENT TOOL

An object of this invention is to provide an economical and reliable handtool which facilitates the adjustment of a wear takeup nut of a friction disc clutch.

Other objects, features and advantages of the present invention will become apparent from the following detailed description taken in conjunction with the accompanying drawings wherein:

FIG. 1 is an elevational view of an improved clutch construction on which the improved tool of the present invention is particularly adapted to be used, FIG. 1, showing a dual arrangement of friction clutches which may be used to effect changes in speed or reversal in rotation of a driven member, the upper half of the left-hand clutch being shown in vertical section and both clutches being shown in their disengaged positions.

FIG. 3 is a side view of a combined pressure plate and detent member of the clutch shown by itself.

FIG. 4 is a vertical section taken on line 4—4 of FIG. 2 illustrating the novel adjusting tool of the invention cooperating with the detent pressure plate to facilitate wear takeup adjustment of the clutch.

FIG. 5 is a fragmentary side elevational view of the adjusting tool of FIG. 4 illustrating the reverse side of the working ends thereof.

FIG. 6 is a vertical section on the line 6—6 of FIG. 4.

Figure 1:
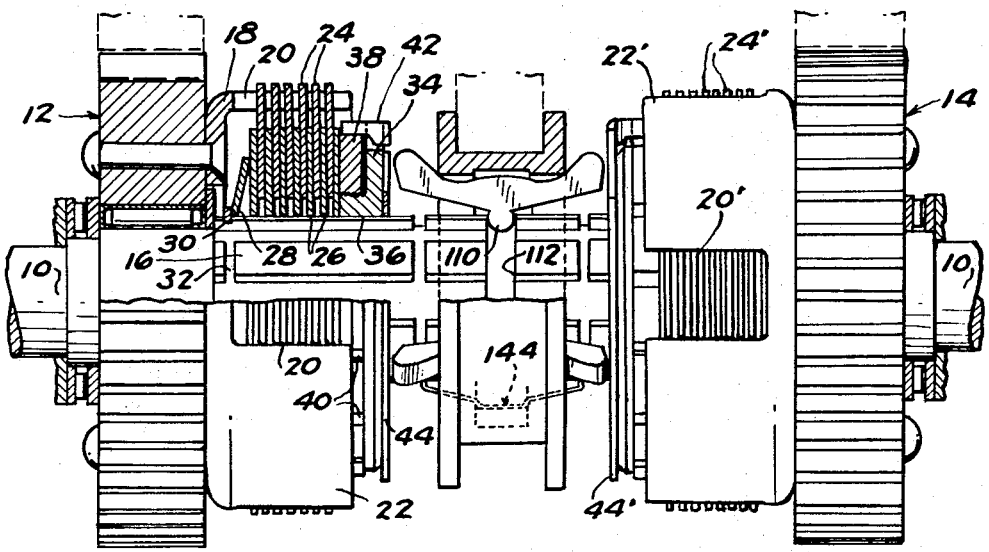

The dual clutch illustrated in the drawings is more fully disclosed and claimed in a copending U.S. Pat. application of Julian S. Pawlina, Ser. No. 736,647, filed June 13, 1968, now U.S. Pat. No. 3,502,184 and assigned to the assignee of record herein, which is incorporated herein by reference and may be referred to for a detailed explanation of the structure and function of the dual clutch. The dual clutch may be used as a forward-reverse friction disc clutch in a transmission of a motor driven hand guided tractor or the like.

Referring to FIG. 1 the clutch assembly is supported on a shaft 10 constituting one of the rotary parts of a transmission which, for purposes of illustration, constitutes the driven member of the clutch construction. A pair of clutch gears 12 and 14 are journaled on shaft 10 by suitable bearings for rotation relative to the shaft. Gears 12 and 14 are or may be continuously driven rotatably in opposite directions by a drive shaft and its associated gears when the clutch is used as a forward-reverse clutch in the transmission in the manner set forth in U.S. Pat. No. 3,333,661.

Figure 2:
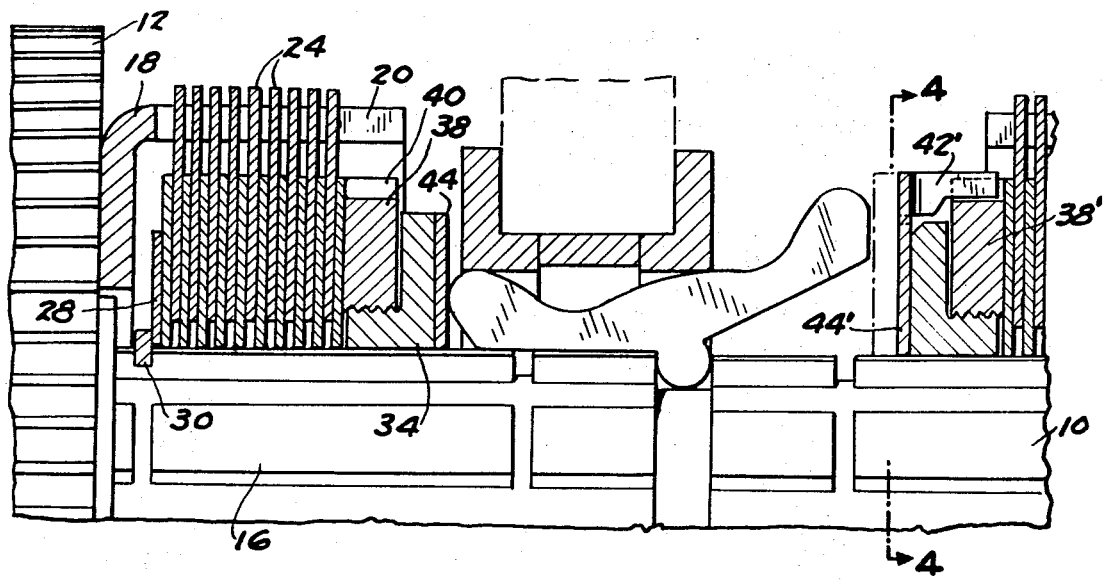
FIG. 2 is a fragmentary elevational view partially in vertical section on a larger scale than FIG. 1 illustrating the left-hand clutch in its engaged position and the right-hand clutch in its disengaged position.

A series of axially extending splines 16 are formed on shaft 10 and a pair of identical friction disc clutches are mounted thereon, one adjacent each of the gears 12 and 14. Since the friction disc clutches are identical, only one will be described, reference hereinafter being made to the left-hand clutch as viewed in FIGS. 1 and 2, the right-hand clutch having primed reference numerals.

A sheet metal cup 18 is riveted to gear 12. Cup 18 has a series of four notches 20 alternating with fingers 22 which extend axially from the base of the cup toward the opposite clutch. Each slot 20 receives therein the keying projection of a plurality of driving friction discs 24. Discs 24 thus are keyed for rotation with gear 12 but are centrally apertured for free rotation and axial movement relative to shaft 10. A plurality of driven friction discs 26 are interleaved with discs 24 and are keyed to spline 16 of shaft 10 to impart rotation thereto. Discs 26 are likewise axially movable on shaft splines 16. Movement of the discs axially to the left as viewed in FIG. 1 is limited by a Belle Ville washer type backing plate 28 which is restrained by a snap ring 30 received in a circumferential groove 32 in splines 16. A pressure ring 34 having a splined center opening 36 is received on splines 16 for axial sliding movement along the shaft but for keyed rotary engagement therewith adjacent the innermost disc of the set. An adjusting ring 38 is threadably carried on pressure ring 34. Ring 38 may be rotated to move it axially relative to the pressure ring to compensate for frictional wear of the disc and ring. The periphery of ring 38 has a series of equally spaced notches 40 (FIG. 4) one of which receives the axially extending finger 42 of a combination locking detent and pressure plate 44 best seen in FIGS. 3 and 4. Plate 44 has a circular center aperture 46 with a single internal tooth 48 which is received between a pair of adjacent splines 16 to key plate 44 for rotation with shaft 10 but which permits axial sliding movement of plate 44 relative to the shaft. The engagement of finger 42 with adjusting ring 38 prevents rotation of ring 38 relative to shaft 10 and hence relative to pressure ring 34 to thereby hold the threaded adjustment of ring 38 on ring 34. Finger 42 extends perpendicularly from an arm 50 adjacent the radially outer end thereof, arm 50 being separated from the remainder of plate 44 by notches 52 and 54 blanked out of the plate. Arm 50 tapers inwardly toward its junction with an inner rim portion 56 of plate 44 to form a resilient hinge connection therewith so that finger 42 may be pivoted from the position shown in FIG. 1, to which it is normally biased by arm 50, to a position as illustrated in FIGS. 4 and 6 wherein finger 42 is disengaged from notch 40.

The present invention is particularly directed to a handtool 60 adapted to be manipulated in the manner of a pair of pliers to disengage locking finger 42 and adjusting ring 38. Tool 60 comprises a pair of handle members or arms 62 and 64 pivotally interconnected by a rivet 66 located much nearer the working ends than to gripping ends 68. 70 of arms 62, 64 respectively. The shank of rivet 66 extends through a circular aperture 72 in arm 62 and is received in an axially extending slot 74 in arm 64. This permits arm 64 to be slid axially or lengthwise within the limits of slot 74 relative to arm 62 while also being pivoted on rivet 66 relative to arm 62.

The working end of arm 62 comprises a fork made up of two tines 76 and 78 (FIGS. 4 and 5), spaced apart by a longitudinally extending slot 80. The lower ends of tines 76 and 78 are bevelled at 82 and 84 to provide chisel point faces.

The working end of arm 64 is necked down at 86 to a narrow projection 88 adapted to loosely fit into any one of notches 40 in adjusting ring 38. As best seen in FIG. 6, handle portion 70 of arm 64 diverges outwardly away from the handle portion 68 of arm 62 from a bend line 90 (FIGS. 4, 5 and 6). Similarly, projection 88 and neck 86 are laterally offset from tines 76 and 78 (FIG. 6) by an outwardly diverging portion 92 of arm 64 which extends from a bend line 94 to a bend line 96 (FIG. 5) so that projection 88 is parallel to tines 76 and 78.

Tool 60 facilitates wear takeup adjustment of the right- or left-hand friction clutches since it enables the operator from a point remote from the clutch to unlock and threadably manipulate adjusting ring 38. In addition, by providing a relatively small hole 100 in the transmission case wall 102, one aligned with each ring 34 and provided with a suitable plug or cover, access may be conveniently obtained for inserting adjusting tool 60 into the transmission case so that neither the transmission case nor the clutch need be disassembled in order to adjust it.

As best shown in FIGS. 4 and 6, in order to adjust for wear of friction discs 24 and 26 of either the right- or left-hand set, tool 60 is inserted through the associated hole 100 with arms 62 and 64 pivoted to parallel position, with tines 76, 78 aligned with the space between arm 50 and ring 34, and with projection 88 aligned with a notch 40 of ring 38. By forcing tool 60 radially inwardly, the chisel faces 82 and 84 wedge and bend resilient arm 50 yieldably outwardly as shown in FIG. 6, while the flat back sides of tines 76 and 78 ride or slide inwardly along the adjacent face of ring 34 until further inward movement of the tool is stopped by slot 80 bottoming on finger 42. By so bending arm 50 out of the plane of plate 44, finger 42 is lifted out of the associated notch, thereby unlocking ring 38 relative to ring 34 and shaft 10. With handle 68 held in one hand and the working end of arm 62 anchored in place by finger 42 engaging slot 80 of arm 62, handle 70 of arm 64 is pivoted about the axis of rivet 66 in the appropriate direction to apply turning force via projection 88 to ring 38 and thereby thread ring 38 axially on pressure ring 34 in the desired direction and amount to take up the slack caused by wear of the friction discs. Arm 70 also can be moved longitudinally due to the freedom of movement provided by slot 74, thereby permitting projection 88 to ride in notch 40 for a greater angular range of travel of the notch during rotation of ring 38. If further rotation of ring 38 is required beyond the single stroke range of the tool in order to effect the desired adjustment, handle 70 is pulled upwardly to retract projection 88 out of the notch 40 in which it was first engaged to clear the periphery of ring 38 so that arm 64 may be pivoted in the opposite direction to bring projection 88 back for engagement in a succeeding notch and the arms again pivoted apart. This sequence of manipulation may be repeated as long as necessary to incrementally rotate ring 38 as required to effect the wear takeup adjustment. Tool 60 is then pulled up out of hole 100, retracting tines 76 and 78 out of engagement with arm 50 and thereby allowing the resilience of arm 50 to bring it back into the plane of plate 44. This brings finger 42 back into whichever notch 40 registers therewith and thus locks adjuster ring 38 in its new position.

I claim:

1. A tool for adjusting a rotatable takeup nut of a disc clutch wherein the nut has a plurality of spaced recesses about its periphery and is locked in adjusted position by an adjacent axially deflectable pressure plate, said tool comprising:
   a. a first arm with a working and a handle end,
   b. a second arm with a working and a handle end,
   c. means pivotally interconnecting said first and second arms so that said working ends of said arms can be swung past each other in generally arcuate paths about said pivot,
   d. projection means connected to the working end of said first arm, said projection means having a necked down portion terminating in a projection adapted to selectively engage a recess in the takeup nut, and
   e. chisel means connected to the working end of said second arm, said chisel means having a longitudinally extending slot opening at the free end of said working end of said second arm, and said free end having chisel faces adjacent the open end of said slot adapted to axially deflect the pressure plate.

2. The tool as defined in claim 1 wherein one of said arms is straight from said handle end to said working end thereof, and wherein the other of said arms has a straight intermediate portion adjacent said means pivotally interconnecting said arms with both said handle end and said working end being laterally offset from said intermediate portion in a direction away from said one arm.

3. The tool as defined in claim 2 wherein one of said arms has a longitudinally extending oblong opening and said pivot means includes a pin extending through said opening to allow limited longitudinal movement of said first and second arms with respect to each other.

4. The tool as defined in claim 1 wherein one of said arms has a longitudinally extending oblong opening and said pivot means includes a pin extending through said opening to allow limited longitudinal movement of said first and second arms with respect to each other.

5. A tool for adjusting a rotatable takeup nut of a disc clutch wherein said nut has a plurality of spaced recesses about its periphery, and is locked in adjusted position by an adjacent pressure plate having an axially deflectable, radially extending detent arm with a detent finger selectively registerable with the recesses of the takeup nut, said tool comprising:
   a. a first arm having a central portion, a working end, and a handle end,
   b. a second arm having a central portion in abutment with said central portion of said first arm, working end, and a handle end, said handle ends and said working ends of said first and second arms being laterally displaced with respect to each other so that said first and second arms can be rotated with respect to each other about said abutting central portions without said working and handle ends interfering with one another,
   c. means connecting said first and second arms at said central portions for pivotal movement with respect to each other,
   d. said central portion of one of said arms having a longitudinally extending opening cooperating with said pivot means to allow limited longitudinal movement of said first and second arms with respect to each other,
   e. one of said working ends including a necked down portion terminating in a longitudinally extending projection engageable in any selected one of the recesses in the periphery of the rotatable takeup nut,
   f. the other of said working ends having a longitudinally extending slot terminating at one end in an opening through the lower extremity of said working end adapted to receive the detent finger of the pressure plate therein, and further having chisel faces on said lower extremity adjacent said opening adapted to pry the detent arm away from the takeup nut to disengage the detent finger from locking engagement with the takeup nut.